United States Patent
Gong et al.

(10) Patent No.: US 8,412,455 B2
(45) Date of Patent: Apr. 2, 2013

(54) VOICE-CONTROLLED NAVIGATION DEVICE AND METHOD

(75) Inventors: Yi-Hua Gong, Shanghai (CN); Guo-Zhi Ding, Shanghai (CN); Chi-Ming Lu, Taipei Hsien (TW)

(73) Assignees: Ambit Microsystems (Shanghai) Ltd., Shanghai (CN); Hon Hai Precision Industry Co., Ltd., New Taipei (TW)

( * ) Notice: Subject to any disclaimer, the term of this patent is extended or adjusted under 35 U.S.C. 154(b) by 328 days.

(21) Appl. No.: 12/905,090

(22) Filed: Oct. 15, 2010

(65) Prior Publication Data

US 2012/0041766 A1    Feb. 16, 2012

(30) Foreign Application Priority Data

Aug. 13, 2010 (CN) .......................... 2010 1 0253223

(51) Int. Cl.
G10L 17/00 (2006.01)
(52) U.S. Cl. .......................................... 701/427; 704/7

(58) Field of Classification Search .................. 701/400, 701/427, 443; 704/200, 220, 231, 1, 243, 704/246, 251, 236, 270, 239, 240, 3–5, 7
See application file for complete search history.

(56) References Cited

U.S. PATENT DOCUMENTS 7,979,270 B2 *  7/2011  Yamada ........................ 704/205
8,244,534 B2 *  8/2012  Qian et al. ................. 704/256.3

* cited by examiner

*Primary Examiner* — Dalena Tran
(74) *Attorney, Agent, or Firm* — Altis Law Group, Inc.

(57) ABSTRACT

In a voice-controlled navigation device and method, a voice command is received, and divided into voice segments Vi (i=1~n) by comparing with one or more keywords. A voice segment Vi (i=1~n) is obtained in sequence to be compared with tree nodes in a search tree of place names. A weight value of each tree node is computed according to a comparison, to select one or more tree nodes whose weight values are greater than a predetermined value. Routes formed by all the selected tree nodes are obtained to select a route whose total weight value is the greatest. A navigation to a destination is given by indicating the selected route on an electronic map according to place names represented by the tree nodes of the selected route.

18 Claims, 5 Drawing Sheets

VOICE-CONTROLLED NAVIGATION DEVICE AND METHOD

BACKGROUND

1. Technical Field

Embodiments of the present disclosure generally relate to a navigation technique, and more particularly to a voice-controlled navigation device and method.

2. Description of Related Art

When manipulating a navigation device, such as a global positioning system (GPS), a user has to manually locate a destination on an electronic map before the navigation device plans a route to the destination. The above-described procedure is troublesome, making it inconvenient and even dangerous to use the navigation device particularly when the user is driving a car.

Voice-controlled navigation devices can be used to amend the above-mentioned problem. The voice-controlled navigation devices employ voice operated systems that convert voice commands provided by users into system commands for data retrieval according to a translation matrix.

The original translation matrix defines that a whole sentence in a voice command should match with each of digitized voice samples. For example, if a user speaks a voice command "city A, district B, road C, and number D," the whole sentence "city A, district B, road C, and number D" is compared with each of the digitized voice samples. However, it is time-consuming if there are too many digitized voice samples.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used hereinafter, refers to logic embodied in hardware or firmware, or to a collection of software instructions, written in a programming language, such as, Java, C, or assembly. One or more software instructions in the modules may be embedded in firmware. It will be appreciated that modules may be comprised of connected logic units, such as gates and flip-flops, and may be comprised of programmable units, such as programmable gate arrays or processors. The modules described herein may be implemented as either software and/or hardware modules and may be stored in any type of computer-readable medium or other computer storage device.

Figure 1:
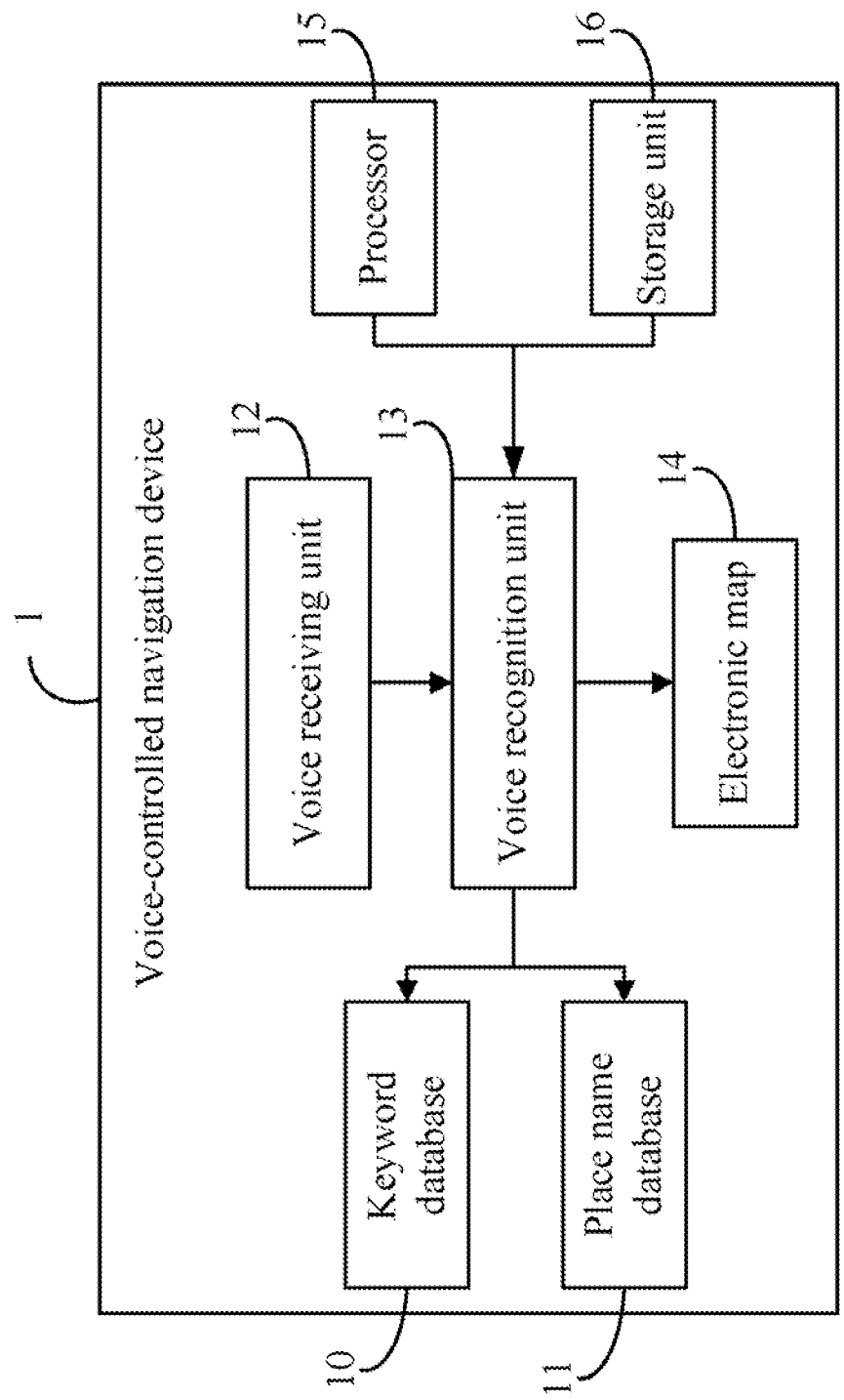
FIG. 1 is a block diagram of a voice-controlled navigation device, according to some embodiments of the present disclosure.

FIG. 1 is a block diagram of a voice-controlled navigation device 1, according to some embodiments of the present disclosure. The voice-controlled navigation device 1 includes components of a keyword database 10, a place name database 11, a voice receiving unit 12, a voice recognition unit 13, an electronic map 14, a processor 15, and a storage unit 16. These components 10-16 communicate over one or more communication buses or signal lines. The voice-controlled navigation device 1 can be any electronic device, including but not limited to a portable computer, a mobile phone, or a personal digital assistant (PDA), for example. It should be appreciated that the voice-controlled navigation device 1 may have more or fewer components than shown in FIG. 1, or a different configuration of components. The various components shown in FIG. 1 may be implemented in hardware, software or a combination thereof, including one or more signal processing and/or application specific integrated circuits.

The keyword database 10 stores one or more predetermined keywords. The keywords include "city", "district", "road", and "number". In some embodiments, the keywords stored in the keyword database 10 are in the form of sound waveforms that represent digitized voice signals of the keywords.

Figure 2:
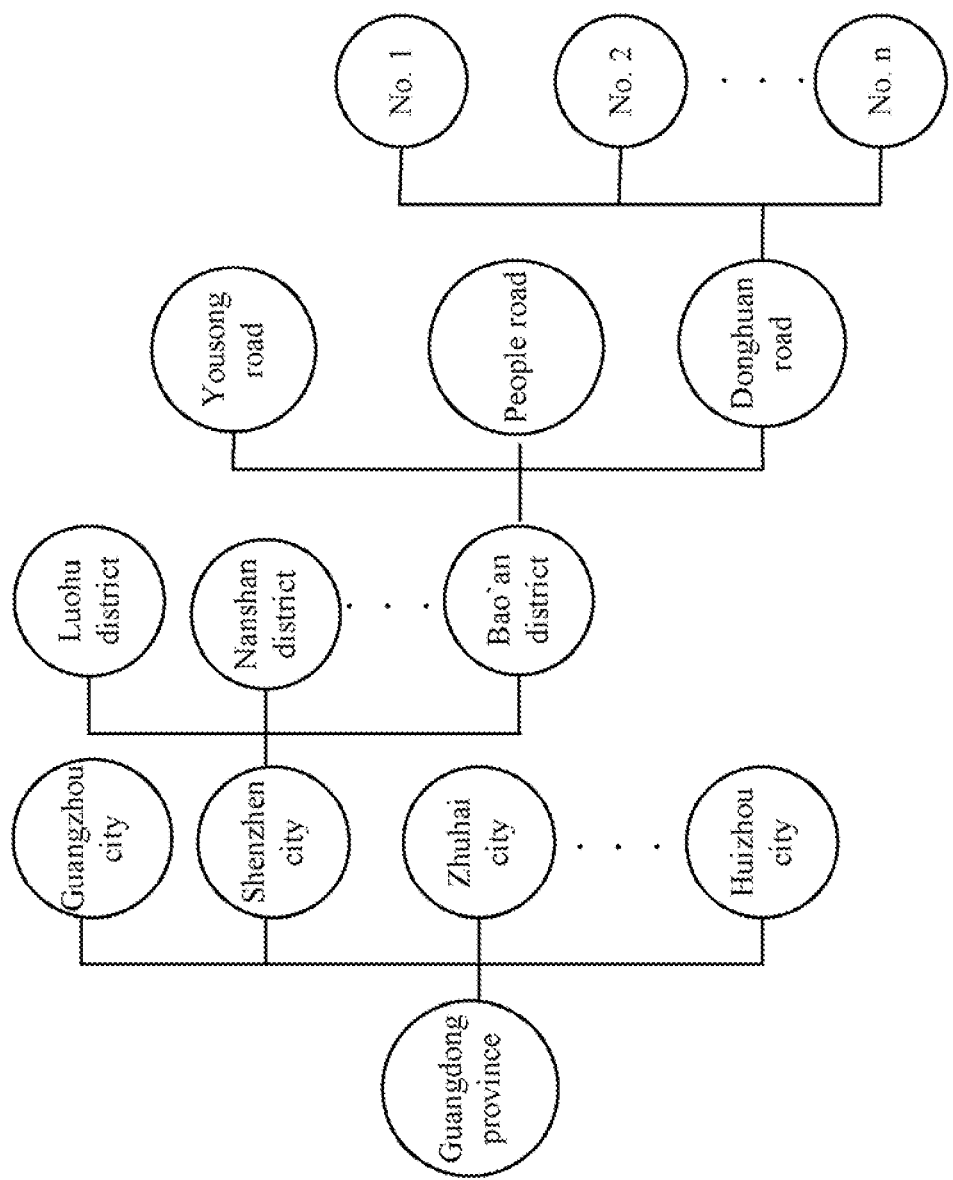
FIG. 2 is an example of a search tree of place names.

The place name database 11 stores a plurality of place names. In some embodiments, the place names may include, but not limited to, a province name, city names, district names, and road names. Referring to FIG. 2, the place names in the place name database 11 are arranged into a search tree. The search tree includes a plurality of tree nodes, each of which represents a place name.

The voice receiving unit 12 may be a microphone, which receives a voice command provided by a user. In some embodiments, a user speaks the voice command into the microphone. Electrical signals of the voice command from the microphone are digitized by an analog-to-digital (A/D) converter (not shown), and is transmitted to the voice recognition unit 13. In some embodiments, the voice command is a destination including words representing place names, such as "city A, district B, road C, and number D."

The voice recognition unit 13 includes a plurality of function modules (see below descriptions referring to FIG. 3), to divide the voice commands provided by the user into one or more voice segments Vi (i=1~n) according to the keywords stored in the keyword database 10; match each of the voice segments Vi (i=1~n) with the place names stored in the place name database 11, to convert the voice command into a system command that the voice-controlled navigation device 1 knows, thus, enable the voice-controlled navigation device 1 to give a navigation to the destination by indicating a route on the electronic map 14.

The function modules of the voice recognition unit 13 may be comprised of one or more computerized codes in the form of one or more programs that are stored in the storage unit 16. The storage unit 16 may include high speed random access memory and may also include non-volatile memory, such as one or more magnetic disk storage devices, flash memory devices, or other non-volatile solid state memory devices. The one or more computerized codes of the voice recognition unit 13 includes instructions that are executed by the processor 15, to provide functions for the function modules of the voice recognition unit 13.

Figure 3:
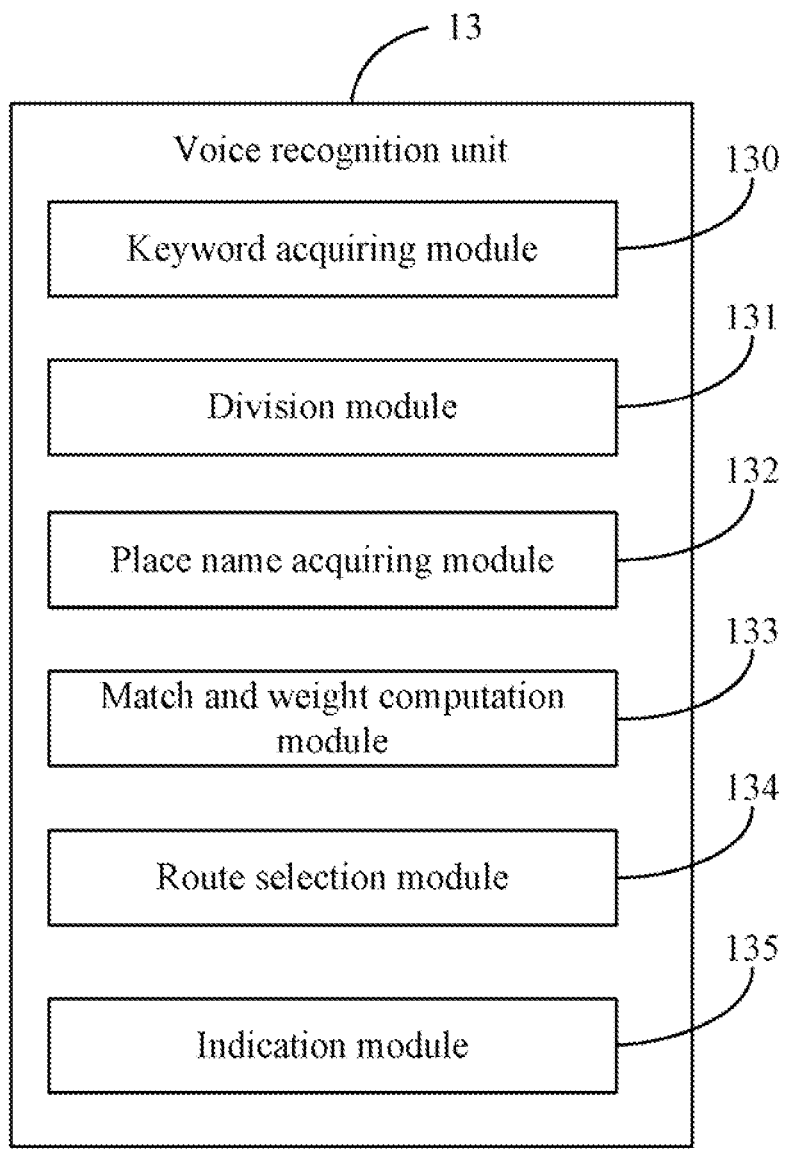
FIG. 3 is a block diagram illustrating function modules of a voice recognition unit included in the voice-controlled navigation device of FIG. 1, according to some embodiments of the present disclosure.

FIG. 3 is a block diagram illustrating function modules of the voice recognition unit 13, according to some embodiments of the present disclosure. The function modules of the voice recognition unit 13 may include a keyword acquiring module 130, a division module 131, a place name acquiring module 132, a match and weight computation module 133, a route selection module 134, and an indication module 135.

The keyword acquiring module 130 acquires the one or more keywords from the keyword database 10. As mentioned above, the keywords stored in the keyword database 10 are in the form of sound waveforms. Thus, in the present embodiment, the keyword acquiring module 130 acquires the sound waveforms of the one or more keywords.

Figure 4:
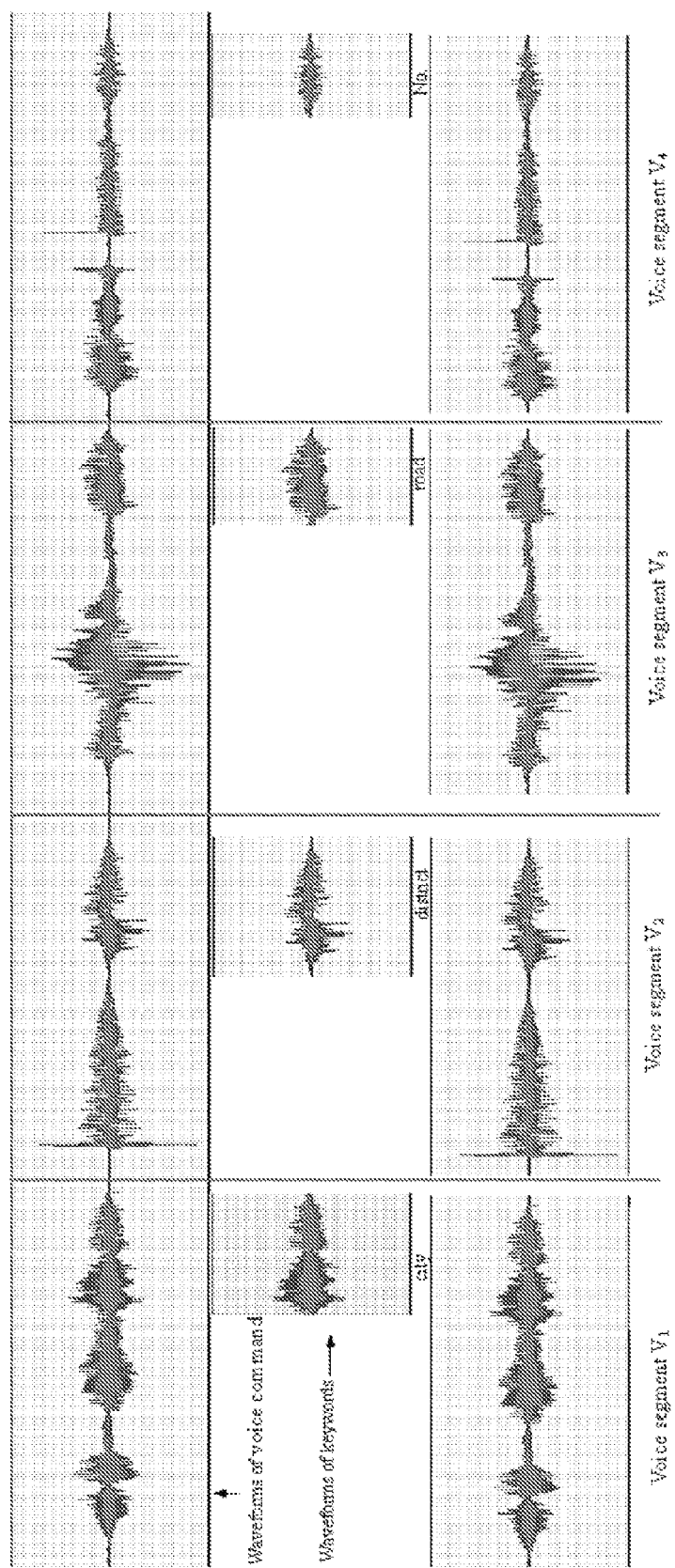
FIG. 4 is an example illustrating a division for a voice command

The division module 131 divides the voice command into voice segments Vi (i=1~n), by comparing the voice command and the keywords. In some embodiments, the voice command is divided by comparing sound waveforms of words in the voice command and the sound waveforms of the keywords. Referring to FIG. 4, the division module 131 initially compares the sound waveform of the keyword "city" with the sound waveforms of the words in the voice command. The division module 131 divides the voice command after a word whose sound waveform is similar to the sound waveform of the keyword "city." The division module 131 then compares the sound waveform of the keyword "district" with the sound waveforms of the other words in the voice command. The division module 131 divides the voice command after a word whose sound waveform is similar to the sound waveform of the keyword "district." The division module 131 then compares the sound waveform of the keyword "road" with the sound waveforms of the other words in the voice command. The division module 131 divides the voice command after a word whose sound waveform is similar to the sound waveform of the keyword "road." The division module 131 finally compares the sound waveform of the keyword "number" with the sound waveforms of the other words in the voice command. The division module 131 divides the voice command after a word whose sound waveform is similar to the sound waveform of the keyword "number."

The place name acquiring module 132 acquires the search tree of the place names from the place name database 11.

The match and weight computation module 133 obtains a voice segment Vi (i=1~n) in sequence, compares the voice segment Vi with tree nodes of the search tree by a tree-traversal method. The match and weight computation module 133 further computes a weight value of each tree node according to a comparison between the voice segment Vi and each tree node, compares the weight value of each tree node with a predetermined value, and selects one or more tree nodes whose weight values are greater than the predetermined value.

The route selection module 134 obtains routes formed by all the selected tree nodes of the search tree, and selects a route whose total weight value is the greatest.

The indication module 135 indicates the selected route on the electronic map 14 according to place names represented by the tree nodes of the selected route.

Figure 5:
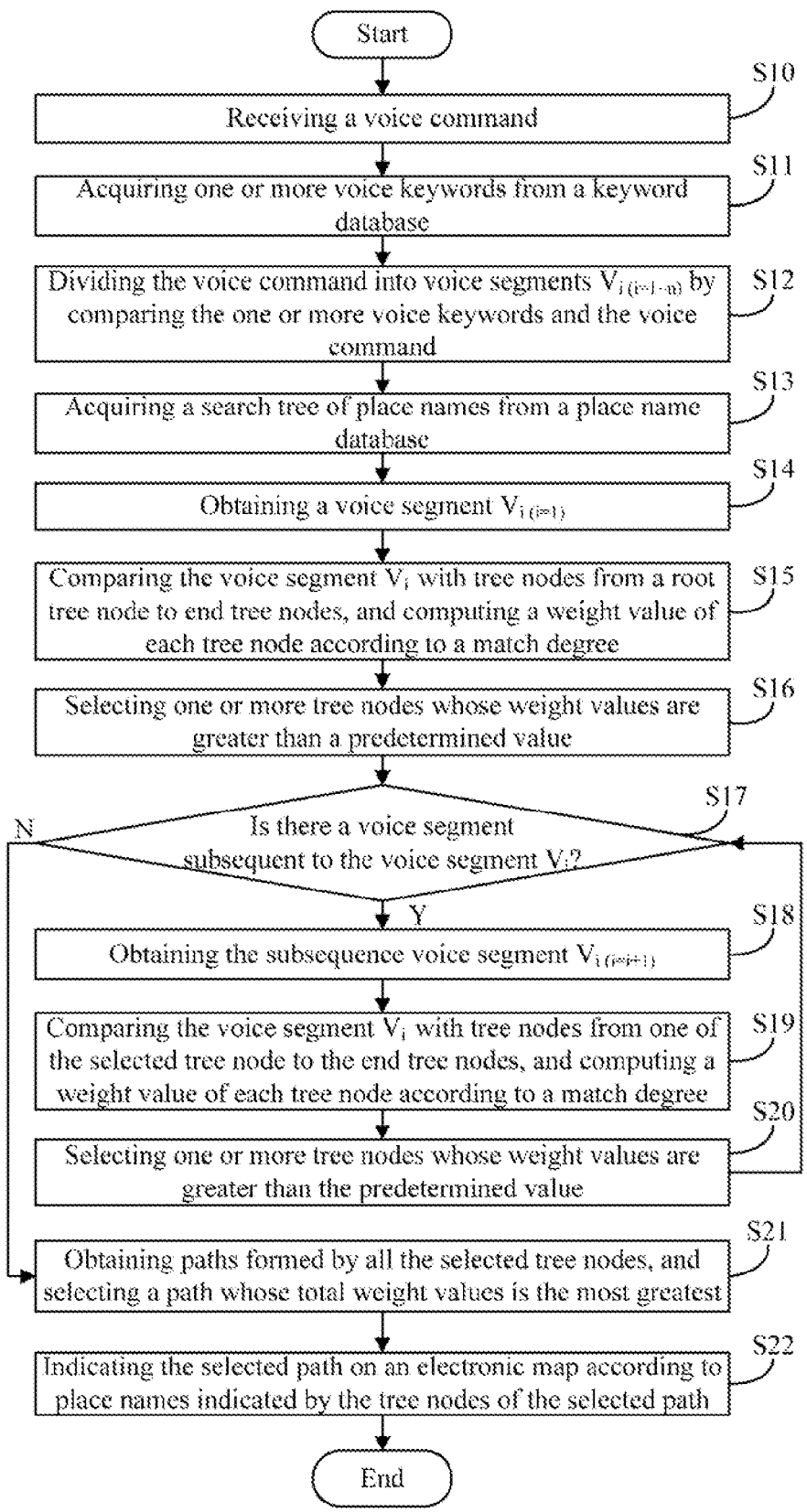
FIG. 5 is a flowchart of a voice-controlled navigation method, according to some embodiments of the present disclosure.

FIG. 5 is a flowchart of a voice-controlled navigation method, according to some embodiments of the present disclosure. The method being performed by execution of computer readable program codes by the processor 15 of the voice-controlled navigation device 1. Depending on the embodiment, additional blocks in the flow of FIG. 5 may be added, others removed, and the ordering of the blocks may be changed.

In block S10, the voice receiving unit 12 receives a voice command provided by a user. In some embodiments, the voice command is a destination including a plurality of words representing place names, such as "city A, district B, road C, and number D."

In block S11, the keyword acquiring module 130 acquires one or more keywords from the keyword database 10. In the present embodiment, the keyword acquiring module 130 acquires the sound waveforms of the one or more keywords.

In block S12, the division module 131 divides the voice command into voice segments Vi (i=1~n), by comparing the voice command and the one or more keywords. In some embodiments, the division module 131 compares the sound waveforms of the keywords with the sound waveforms of the words in the voice command, and divides the voice command after words whose sound waveform are similar to the sound waveforms of the keywords.

In block S13, the place name acquiring module 132 acquires the search tree of the place names from the place name database 11.

In block S14, the match and weight computation module 133 obtains a voice segment Vi (i=1).

In block S15, the match and weight computation module 133 compares the voice segment Vi with tree nodes, which are from a root tree node to end tree nodes, of the search tree by a tree-traversal method, and computes a weight value of each tree node according to a comparison between the voice segment Vi and each tree node.

In block S16, the match and weight computation module 133 compares the weight value of each tree node with a predetermined value, and selects one or more tree nodes whose weight values are greater than the predetermined value.

In block S17, the match and weight computation module 133 determines if there is a subsequent voice segment Vi (i=2~n). Block S18 is implemented if there is a subsequent voice segment Vi (i=2~n). Otherwise, block S21 is implemented if there is no subsequent segment Vi (i=2~n).

In block S18, the match and weight computation module 133 obtains a voice segment Vi (i=i+1).

In block S19, the match and weight computation module 133 compares the voice segment Vi with tree nodes, which are from one of the just selected tree node to the end tree nodes, of the search tree by tree-traversal, and computes a weight value of each tree node according to a comparison between the voice segment Vi and each tree node.

In block S20, the match and weight computation module 133 compares the weight value of each tree node with the predetermined value, and selects one or more tree nodes whose weight values are greater than the predetermined value. Block S17 is repeated after block S20.

In block S21, the route selection module 134 obtains routes formed by all the selected tree nodes of the search tree, and selects a route whose total weight value is the greatest.

In block S22, the indication module 135 gives a navigation to the destination by indicating the selected route on the electronic map 14 according to place names represented by the tree nodes of the selected route.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A voice-controlled navigation method, the method being performed by execution of computer readable program code by at least one processor of an electronic device, and comprising:
   (a) receiving a voice command of a destination which comprises place names, and dividing the voice command into voice segments Vi (i=1~n) by comparing the voice command with one or more keywords by the at least one processor;

(b) obtaining a voice segment Vi (i=1~n), comparing the voice segment Vi with tree nodes of a search tree, wherein the tree nodes of the search tree represent place names, computing a weight value of each tree node according to a comparison between the voice segment Vi and each tree node, and selecting one or more tree nodes whose weight values are greater than a predetermined value by the at least one processor;

(c) obtaining routes formed by all the selected tree nodes of the search tree, and selecting a route whose total weight value is the greatest by the at least one processor; and (d) giving a navigation to the destination by indicating the selected route on an electronic map according to place names represented by the tree nodes of the selected route by the at least one processor.

2. The method as described in claim 1, wherein the keywords comprises: "city", "district", "road", and "number".

3. The method as described in claim 1, wherein the one or more keywords are stored in a keyword database in the form of sound waveforms that represent digitized sound of the keywords.

4. The method as described in claim 3, wherein the comparison in block (a) comprises:
comparing the sound waveforms of the keywords with sound waveforms of place names in the voice command by the at least one processor; and
dividing the voice command after the place name whose sound waveform is similar to the sound waveform of one of the keywords by the at least one processor.

5. The method as described in claim 1, wherein the search tree is stored in a place name database.

6. The method as described in claim 1, wherein block (b) further comprises:
(b1) obtaining a voice segment Vi (i=1), comparing the voice segment Vi with the tree nodes from a root tree node to end tree nodes, and computing a weight value of each tree node according to a comparison between the voice segment Vi and each tree node by the at least one processor;
(b2) selecting one or more tree nodes whose weight values are greater than the predetermined value by the at least one processor;
(b3) obtaining a voice segment Vi (i=i+1), comparing the voice segment Vi with the tree nodes from one of the just selected tree node to the end tree nodes, and computing a weight value of each tree node according to a comparison between the voice segment Vi and each tree node by the at least one processor;
(b4) selecting one or more tree nodes whose weight values are greater than the predetermined value by the at least one processor; and
(b5) repeating blocks (b3) and (b4) until there is no Vi (i=i+1) by the at least one processor.

7. A non-transitory storage medium having stored thereon instructions that, when executed by a processor, cause the processor to perform a voice-controlled navigation method, wherein the method comprises:
(a) receiving a voice command of a destination which comprises place names, and dividing the voice command into voice segments Vi (i=1~n) by comparing the voice command with one or more keywords;
(b) obtaining a voice segment Vi (i=1~n), comparing the voice segment Vi with tree nodes of a search tree, wherein the tree nodes of the search tree represent place names, computing a weight value of each tree node according to a comparison between the voice segment Vi and each tree node, and selecting one or more tree nodes whose weight values are greater than a predetermined value;
(c) obtaining routes formed by all the selected tree nodes of the search tree, and selecting a route whose total weight value is the greatest; and
(d) giving a navigation to the destination by indicating the selected route on an electronic map according to place names represented by the tree nodes of the selected route.

8. The non-transitory storage medium as described in claim 7, wherein the keywords comprises: "city", "district", "road", and "number".

9. The non-transitory storage medium as described in claim 7, wherein the one or more keywords are stored in a keyword database in the form of sound waveforms that represent digitized sound of the keywords.

10. The non-transitory storage medium as described in claim 9, wherein the comparison in block (a) comprises:
comparing the sound waveforms of the keywords with sound waveforms of the place names in the voice command; and
dividing the voice command after the place name whose sound waveform is similar to the sound waveform of one of the keywords.

11. The non-transitory storage medium as described in claim 7, wherein the search tree is stored in a place name database.

12. The non-transitory storage medium as described in claim 7, wherein block (b) further comprises:
(b1) obtaining a voice segment Vi (i=1), comparing the voice segment Vi with the tree nodes from a root tree node to end tree nodes, and computing a weight value of each tree node according to a comparison between the voice segment Vi and each tree node;
(b2) selecting one or more tree nodes whose weight values are greater than the predetermined value;
(b3) obtaining a voice segment Vi (i=i+1), comparing the voice segment Vi with the tree nodes from one of the just selected tree node to the end tree nodes, and computing a weight value of each tree node according to a comparison between the voice segment Vi and each tree node;
(b4) selecting one or more tree nodes whose weight values are greater than the predetermined value; and
(b5) repeating blocks (b3) and (b4) until there is no Vi (i=i+1).

13. A voice-controlled navigation device, comprising:
voice receiving unit to receive a voice command of a destination which comprises place names;
at least one processor;
storage unit;
an electronic map;
one or more programs that are stored in the storage unit and are executed by the at least one processor, the one or more programs comprising:
a division module to divide the voice command into voice segments Vi (i=1~n) by comparing the voice command with one or more keywords;
a place name acquiring module to acquire a search tree, wherein the search tree comprises a plurality of tree nodes, each of which represents a place name;
a match and weight computation module to obtain a voice segment Vi (i=1~n), compare the voice segment Vi (i=1~n) with the tree nodes of the search tree, compute a weight value of each tree node according to a comparison between the voice segment Vi and each tree node, and select one or more tree nodes whose weight values are greater than a predetermined value;

a route selection module to obtain routes formed by all the selected tree nodes of the search tree, and select a route whose total weight value is the greatest; and an indication module to give a navigation to the destination by indicating the selected route on the electronic map according to place names represented by the tree nodes of the selected route.

14. The voice-controlled navigation device as described in claim 13, wherein the one or more keywords comprises: "city", "district", "road", and "number".

15. The voice-controlled navigation device as described in claim 13, wherein the one or more keywords are stored in a keyword database in the form of sound waveforms that represent digitized sound of the keywords.

16. The voice-controlled navigation device as described in claim 15, wherein the comparison between the voice segment Vi (i=1~n) and the tree nodes of the search tree executed by the division module comprises:

comparing the sound waveforms of the keywords with sound waveforms of the place names in the voice command; and dividing the voice command after the place name whose sound waveform is similar to the sound waveforms of one of the keywords.

17. The voice-controlled navigation device as described in claim 13, wherein the match and the computation executed by the match and weight computation module comprises:

(1) obtaining a voice segment Vi (i=1), comparing the voice segment Vi with the tree nodes from a root tree node to end tree nodes, and computing a weight value of each tree node according to a comparison between the voice segment Vi and each tree node;

(2) selecting one or more tree nodes whose weight values are greater than the predetermined value;

(3) obtaining a voice segment Vi (i=i+1), comparing the voice segment Vi with the tree nodes from one of the just selected tree node to the end tree nodes, and computing a weight value of each tree node according to a comparison between the voice segment Vi and each tree node;

(4) selecting one or more tree nodes whose weight values are greater than the predetermined value; and (5) repeating blocks (3) and (4) until there is no Vi (i=i+1).

18. The voice-controlled navigation device as described in claim 13, wherein voice receiving unit is a microphone.

* * * * *